(12) United States Patent
Kweon et al.

(10) Patent No.: US 12,024,441 B1
(45) Date of Patent: Jul. 2, 2024

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Hee Jun Kweon, Daejeon (KR); Jeong Bae Yoon, Daejeon (KR); Ji Hoon Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/448,976

(22) Filed: Aug. 14, 2023

(30) Foreign Application Priority Data

Dec. 7, 2022 (KR) .......................... 10-2022-0169569

(51) Int. Cl.
*C01G 53/00* (2006.01)
*H01M 4/525* (2010.01)
*H01M 10/0525* (2010.01)

(52) U.S. Cl.
CPC ............ *C01G 53/50* (2013.01); *H01M 4/525* (2013.01); *H01M 10/0525* (2013.01); *C01P 2002/60* (2013.01); *C01P 2002/74* (2013.01); *C01P 2002/76* (2013.01)

(58) Field of Classification Search
CPC .............. C01P 2002/60; C01P 2002/74; C01P 2002/76; H01M 4/525; C01G 53/50
See application file for complete search history.

(56) References Cited

U.S. PATENT DOCUMENTS

| | | | | |
|---|---|---|---|---|
| 2017/0358798 | A1* | 12/2017 | Kageura | C01G 53/006 |
| 2019/0027748 | A1* | 1/2019 | Kim | H01M 4/131 |
| 2020/0403240 | A1 | 12/2020 | Sun | |
| 2022/0093962 | A1* | 3/2022 | Kim | H01M 4/0471 |

FOREIGN PATENT DOCUMENTS

| | | |
|---|---|---|
| EP | 3101716 B1 | 7/2018 |
| KR | 10-0821523 B1 | 4/2008 |
| KR | 10-2016-0026307 A | 3/2016 |
| KR | 10-2017-0113385 A | 10/2017 |
| KR | 10-2018-0027261 A | 3/2018 |
| KR | 10-1992760 B1 | 6/2019 |
| KR | 10-2019-0113607 A | 10/2019 |
| KR | 10-2288293 B1 | 8/2021 |
| KR | 10-2022-0023454 A | 3/2022 |
| KR | 10-2022-0023569 A | 3/2022 |
| KR | 10-2022-0040889 A | 3/2022 |

OTHER PUBLICATIONS

Office Action for Korean Patent Application No. 10-2022-0169569 issued by the Korean Patent Office dated Jul. 1, 2023.
Extended European Search Report for the European Patent Application No. 23192205.5 issued by the European Patent Office on Mar. 5, 2024.

* cited by examiner

*Primary Examiner* — Brittany L Raymond
(74) *Attorney, Agent, or Firm* — IP & T GROUP LLP

(57) ABSTRACT

A cathode active material for a lithium secondary battery has a structure of a lithium-nickel-based metal oxide. A crystal size in a (104) plane defined by Equation 1 is less than 200 nm. A thickness of a TM slab measured by a Rietveld method in a crystal structure of a space group R-3m by an X-ray diffraction (XRD) analysis is 2.15 Å or less. A thickness of a Li slab thickness measured by the Rietveld method in the crystal structure of the space group R-3m by the XRD analysis is 2.585 Å or more.

13 Claims, 2 Drawing Sheets

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM O PRIORITY

This application claims priority to Korean Patent Application No. 10-2022-0169569 filed on Dec. 7, 2022 in the Korean Intellectual Property Office (KIPO), the entire disclosure of which is incorporated by reference herein.

BACKGROUND

1. Field

The disclosure of the present application relates to a cathode active material for a lithium secondary battery and a lithium secondary battery including the same. More particularly, the present invention relates to a cathode active material containing a lithium metal oxide, and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

Examples of the secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

As an application range of the lithium secondary batteries is extended to large devices such as the hybrid vehicle, a high-nickel (High-Ni)-based lithium oxide having an increased nickel content is used as a cathode active material for obtaining high capacity of the lithium secondary battery. The cathode active material may be prepared by reacting a nickel-containing precursor and a lithium source.

However, the life-span and operation stability of the lithium secondary battery may be deteriorated due to a side reaction with the electrolyte and a structural instability of the High-Ni-based lithium oxide.

SUMMARY

According to an aspect of the present disclosure, there is provided a cathode active material for a lithium secondary battery having improved structural and chemical stability.

According to an aspect of the present disclosure, there is provided a lithium secondary battery including the cathode active material.

A cathode active material for a lithium secondary battery has a structure of a lithium-nickel-based metal oxide. A crystal size in a (104) plane defined by Equation 1 is less than 200 nm, a thickness of a TM slab measured by a Rietveld method in a crystal structure of a space group R-3m by an X-ray diffraction (XRD) analysis is 2.15 Å or less, and a thickness of a Li slab thickness measured by the Rietveld method in the crystal structure of the space group R-3m by the XRD analysis is 2.585 Å or more.

$$L_{104} = \frac{K\lambda}{\beta_{104}\cos\theta} \quad \text{[Equation 1]}$$

In Equation 1, $L_{104}$ is a crystal size (nm) in the (104) plane, K is a shape factor, $\lambda$ is an X-ray wavelength (nm), $\beta_{104}$ is a full width at half maximum (rad) of a (104) plane peak from the XRD analysis, and $\theta$ represents a diffraction angle (rad).

In some embodiments, the lithium-nickel-based metal oxide may have a layered structure or a crystal structure represented by Chemical Formula 1-1.

$$Li_xNi_aCo_{b1}Mn_{c1}M1_{d1}O_{2+y} \quad \text{[Chemical Formula 1-1]}$$

In Chemical Formula 1-1, M1 may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr, $0.8 \leq x \leq 1.5$, $-0.1 \leq y \leq 0.1$, $0.88 \leq a \leq 0.98$, $0 \leq b1 \leq 0.1$, $0 \leq c1 \leq 0.1$, $0 \leq d1 \leq 0.1$ and $a+b1+c1+d1=1$.

In some embodiments, $b1 \geq c1$ in Chemical Formula 1-1.

In some embodiments, the thickness of the TM slab may be in a range from 2.13 Å to 2.145 Å.

In some embodiments, the thickness of the Li slab may be in a range from 2.59 Å to 2.615 Å.

In some embodiments, wherein a ratio of the thickness of the Li slab to the thickness of the TM slab may be in a range from 1.20 to 1.25.

In some embodiments, the crystal size in the (104) plane defined by Equation 1 may be 120 nm or less.

In some embodiments, the crystal size in the (104) plane defined by Equation 1 may be 50 nm or more.

In some embodiments, the crystal size in a (003) plane defined by Equation 2 below may be in a range from 150 nm to 300 nm.

$$L_{003} = \frac{K\lambda}{\beta_{003}\cos\theta} \quad \text{[Equation 2]}$$

In Equation 2, $L_{003}$ is the crystal size (nm) in the (003) plane, K is a shape factor, $\lambda$ is an X-ray wavelength (nm), $\beta_{003}$ is a full width at half maximum (rad) of a (003) plane peak from the XRD analysis, and $\theta$ represents a diffraction angle (rad).

In some embodiments, a ratio of the crystal size defined by Equation 2 to the crystal size defined by Equation 1 may be in a range from 1.5 to 3.

In some embodiments, an a-axis lattice constant and a b-axis lattice constant measured by the Rietveld method in the crystal structure of the space group R-3m by the XRD analysis may be the same, and a ratio of a c-axis lattice constant to the a-axis lattice constant may be in a range from 4.8 to 5.2.

In some embodiments, a volume of a unit cell of the crystal structure may be in a range from 101.6 Å³ to 101.9 Å³.

In some embodiments, a ratio of a peak intensity of a (003) plane to a peak intensity of the (104) plane by the XRD analysis may be in a range from 1.8 to 2.2.

A lithium secondary battery includes a cathode including the cathode active material layer for a lithium secondary battery according to the above-described embodiments, and an anode facing the cathode.

A cathode active material for a lithium secondary battery according to exemplary embodiments includes a high nickel content, and may have a crystallite size less than 200 nm in a (104) plane. Accordingly, a specific surface area of the cathode active material may be increased, thereby providing a cathode having improved active capacity.

The cathode active material may have a TM slab thickness of 2.15 Å or less and a Li slab thickness of 2.585 Å or more in a crystal structure through an XRD analysis. Within the thickness ranges of the TM slab and the Li slab, interactions between transition metals in the TM slab may be reduced, and reversible mobility of lithium ions may be improved.

Thus, a cation mixing at an inside of the cathode active material may be reduced, thereby improving life-span properties of the cathode. Further, the mobility of the lithium ions may be enhanced to improve power properties of the cathode.

In some embodiments, the cathode active material may have a high cobalt content relatively to manganese content. Accordingly, a cathode having improved high-temperature life-span properties may be implemented.

A lithium secondary battery according to example embodiments may include the cathode active material for a lithium secondary battery to have improved life-span and capacity properties.

DETAILED DESCRIPTION OF THE EMBODIMENTS

A cathode active material for a lithium secondary battery according to example embodiments includes lithium-nickel-based oxide particles and may have a predetermined crystal size and crystal structure.

Further, a lithium secondary battery according to example embodiments includes the cathode active material, and may have improved life-span and power properties.

Hereinafter, embodiments provided in the present disclosure will be described in detail. However, those skilled in the art will appreciate that such embodiments and drawings are provided to further understand the spirit of the present invention and do not limit subject matters to be protected as disclosed in the detailed description and appended claims.

<Cathode Active Material for Lithium Secondary Battery>

A cathode active material for a lithium secondary battery (hereinafter, that may be abbreviated as a cathode active material) according to example embodiments may include a lithium-nickel-based metal oxide.

In some embodiments, the cathode active material may further contain cobalt (Co) as a transition metal and may further contain manganese (Mn). For example, the cathode active material may include a nickel-cobalt-manganese (NCM)-based lithium oxide.

In some embodiments, nickel (Ni) may be included in the largest content (molar ratio or atomic %) among elements except for lithium and oxygen in the lithium-nickel-based metal oxide. For example, the Ni content may be 0.80 or more, 0.88 or more, 0.90 or more, or 0.92 or more. In some embodiments, the Ni content may be 0.94 or more, 0.96 or more, or 0.98 or more to provide higher capacity.

However, as the content of Ni increases, life-span properties and power stability of a cathode or a secondary battery may be relatively degraded. For example, as the content of nickel increases, a cation mixing that nickel is replaced with lithium (Li) of the cathode active material to hinder a movement of Li may easily occur. However, according to embodiments of the present disclosure, thicknesses of a TM slab and a Li slab of the lithium-nickel-based metal composite oxide may be controlled to reduce a cation mixing ratio.

The thickness of the TM slab is a thickness of a transition metal layer or O-TM-O in a octahedral structure ($TMO_6$) containing a transition metal (TM) obtained by an X-ray diffraction (XRD) Rietveld Refinement analysis.

The thickness of the Li slab is a thickness of a lithium layer or O—Li—O in an octahedral structure ($LiO_6$) containing Li obtained by the XRD Rietveld method analysis.

The TM slab and the Li slab may be obtained from a crystal structure analysis by a Rietveld method when a space group R-3m is used for a crystal structure model based on the XRD analysis.

Figure 1:
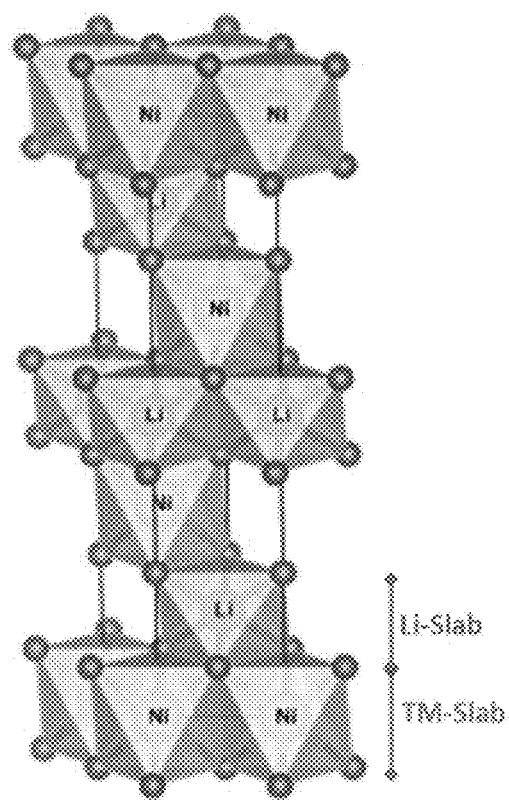
FIG. 1 is a schematic diagram illustrating a crystal structure of a cathode active material in accordance with example embodiments.

FIG. 1 is a schematic diagram illustrating a crystal structure of a cathode active material in accordance with example embodiments. In FIG. 1, Ni is shown as an example of the transition metal included in the TM slab. When a cathode active material precursor reacts with a lithium source, a lithium layer may be formed while lithium ions are doped or intercalated.

In the cathode active material for a lithium secondary battery according to example embodiments, the thickness of the TM slab measured by the Rietveld method in the crystal structure model of a space group R-3m through the XRD analysis may be 2.15 Å or less, or 2.145 Å or less. In some embodiments, the thickness of the TM slab may be 2.13 Å or more, or 2.135 Å or more.

For example, the thickness of the TM slab may be from 2.13 Å to 2.15 Å, from 2.135 Å to 2.15 Å, from 2.135 Å to 2.145 Å, or from 2.138 Å to 2.145 Å. In some embodiments, the thickness of the TM slab may be in a range from 2.138 Å and 2.143 Å.

Within the above range, inhibition of an interaction between the transition metals due to a close distance between the transition metal and oxygen (O) in the TM slab may be prevented while also preventing the thickness of the TM slab from being excessively reduced. For example, when the thickness of the TM slab is reduced, the lithium layer may be collapsed and the space group R-3m crystal structure through the XRD analysis may be distorted. In this case, the movement of lithium (Li) may be hindered, and micro-cracks and macro-cracks may occur in an internal structure of the active material. The thickness of the TM slab may be maintained within the above range, so that the micro- and macro-cracks in the internal structure of the active material may be prevented.

In the cathode active material for a lithium secondary battery according to example embodiments, the thickness of the Li slab measured by the Rietveld method in the crystal structure model of a space group R-3m through the XRD analysis may be 2.585 Å or more, or 2.59 Å or more.

In some embodiments, the thickness of the Li slab may be 2.615 Å or less, or 2.595 Å or less.

For example, the thickness of the Li slab may be from 2.585 Å to 2.615 Å, from 2.585 Å to 2.61 Å, from 2.585 Å to 2.605 Å, from 2.585 Å to 2.6 Å, from 2.585 Å to 2.595 Å, or from 2.59 Å to 2.595 Å. In some embodiments, the thickness of the Li slab may be in a range from 2.59 Å and 2.593 Å.

Within the above range, a sufficient distance between lithium and oxygen in the Li slab may be maintained while preventing an excessive increase of the distance. Accordingly, intercalation and deintercalation of lithium may be easily performed in an entire area without a deactivated area while suppressing collapse of a lattice structure of the cathode active material.

In some embodiments, a ratio of the thickness of the Li slab relative to the thickness of the TM slab may be from 1.20 to 1.25, from 1.20 to 1.23, from 1.202 to 1.228, from 1.202 to 1.225, from 1.202 to 1.222, from 1.202 to 1.22, or from 1.202 to 1.218. In some embodiments, the ratio of the thickness of the Li slab to the thickness of the TM slab may be in a range from 1.204 to 1.218, from 1.206 to 1.218, or from 1.206 to 1.213.

Within this range, intercalation and deintercalation may be easily performed while reducing the cation mixing ratio of between nickel ions and lithium ions. Accordingly, the cathode for a lithium secondary battery having improved capacity and life-span may be provided.

A cathode active material for a lithium secondary battery according to exemplary embodiments may have a crystal size defined by Equation 1 below of less than 200 nm, or 120 nm or less in a (104) plane. In some embodiments, the crystal size in the (104) plane defined by Equation 1 below may be 50 nm or more, or 75 nm or more.

For example, the crystal size in the (104) plane defined by Equation 1 may be in a range from 50 nm to 200 nm, from 50 nm to 175 nm, from 50 nm to 150 nm, from 50 nm to 125 nm, or from 75 nm to 125 nm. In some embodiments, the crystal size in the (104) plane defined by Equation 1 below be in a range from 75 nm to 100 nm.

$$L_{104} = \frac{K\lambda}{\beta_{104}\cos\theta} \quad \text{[Equation 1]}$$

In Equation 1, $L_{104}$ is a crystal size (nm) in the (104) plane, K is a shape factor, $\lambda$ is an X-ray wavelength (nm), $\beta_{104}$ is a full width at half maximum (rad) of a (104) plane peak through an XRD analysis, and $\theta$ represents a diffraction angle (rad). For example, the shape factor K may be 0.9.

Within the above range, aggregation between the cathode active materials may be prevented while increasing a specific surface area of the cathode active materials. Accordingly, accessibility of lithium ions may be facilitated, and electrical conductivity and power properties of the lithium secondary battery may be improved, and dispersibility may be improved.

In some embodiments, the cathode active material for a lithium secondary battery has a crystal size ranging from 150 nm to 300 nm, from 175 nm to 300 nm, from 200 nm to 300 nm, or from 220 nm to 300 nm in a (003) plane defined by Equation 2 below. In some embodiments, the crystal size in the (003) plane defined by Equation 2 below may be in a range from 220 nm to 275 nm.

$$L_{003} = \frac{K\lambda}{\beta_{003}\cos\theta} \quad \text{[Equation 2]}$$

In Equation 2, $L_{003}$ is a crystal size (nm) in the (003) plane, K is a shape factor, $\lambda$ is an X-ray wavelength (nm), $\beta_{003}$ is a full width at half maximum (rad) of a (003) plane peak through an XRD analysis, and $\theta$ represents a diffraction angle (rad). For example, the shape factor K may be 0.9.

In some embodiments, the ratio of the crystal size in the (003) plane to the crystal size in the (104) plane may be in a range from 1.5 to 3.0, from 1.7 to 3.0, from 2.0 to 3.0, from 2.2 to 3.0, or from 2.2 to 2.8. In some embodiments, the ratio of the crystal size in the (003) plane to the crystal size in the (104) plane may be in a range from 2.25 to 2.75.

Within the above range, stability of the crystal structure of the space group R-3m through the XRD analysis may be improved even when the crystal size of the cathode active material in the (104) plane is less than 200 nm.

In some embodiments, an a-axis lattice constant and a b-axis lattice constant obtained from a crystal structure analysis by a Rietveld method in the space group R-3m crystal structure through the XRD analysis may be substantially the same. For example, a difference between the a-axis lattice constant and the b-axis lattice constant may be less than 0.0005 Å. A c-axis lattice constant may be greater than the a-axis lattice constant and the b-axis lattice constant.

For example, the a-axis lattice constant and the b-axis lattice constant may each be in a range from 2.87 Å to 2.89 Å, from 2.87 Å to 2.885 Å, from 2.87 Å to 2.88 Å, or from 2.873 Å to 2.88 Å. In some embodiments, the a-axis lattice constant and the b-axis lattice constant may each be in a range from 2.875 Å and 2.88 Å.

For example, the c-axis lattice constant may be in a range from 14.18 Å to 14.21 Å, from 14.185 Å to 14.21 Å, from 14.185 Å to 14.205 Å, from 14.19 Å to 14.205 Å, or from 14.19 Å to 14.20 Å. In some embodiments, the c-axis lattice constant may be in a range from 14.193 Å and 14.199 Å.

In an embodiment, a ratio of the c-axis lattice constant to the a-axis lattice constant may be in a range from 4.80 to 5.20, from 4.90 to 5.05, from 4.905 to 4.95, or from 4.91 to 4.945. In some embodiments, the ratio of the c-axis lattice constant to the a-axis lattice constant may be in a range from 4.915 to 4.94.

Within the above range, two-dimensional structures of the transition metals may be stably stacked in the space group R-3m crystal structure through the X-ray diffraction analysis. Accordingly, the cathode active material may be formed in a stable hexagonal crystal structure.

In some embodiments, a volume of a unit cell of the crystal structure may be in a range from 101.6 Å$^3$ to 101.9 Å$^3$, from 101.65 Å$^3$ to 101.9 Å$^3$, from 101.65 Å$^3$ to 101.85 Å$^3$, or from 101.7 Å$^3$ to 101.8 Å$^3$. In some embodiments the volume of the unit cell of the crystal structure may be in a range from 101.73 Å$^3$ and 101.79 Å$^3$.

Within the above range, the hexagonal crystal structure may be stably maintained despite a volume change caused by repetitive charging and discharging of the lithium secondary battery.

The term "unit cell" used herein refers to a basic stack structure unit formed by including Li and the transition metal (e.g., Ni, etc.) as shown in FIG. 1, and may indicate the smallest unit capable of expressing a crystal through a translational movement.

In some embodiments, a ratio of a peak intensity of the (003) plane to a peak intensity of the (104) plane from the XRD analysis may be in a range from 1.8 to 2.2, from 1.85 to 2.2, from 1.85 to 2.1, or from 1.9 to 2.1. In some embodiments, the ratio of the peak intensity of the (003) plane to the peak intensity of the (104) plane may be in a range from 1.9 to 2.05.

The ratio of the peak intensity of the (003) plane to the peak intensity of the (104) plane may be an index indicating a crystallinity of the cathode active material. Accordingly, within the above peak intensity range, the cathode active material may have a stable hexagonal layered structure, and the cation mixing ratio may be reduced to, e.g., a level of less than 1.5%.

The cathode active material for a secondary lithium battery according to example embodiments may include a lithium-nickel-based metal oxide.

For example, the lithium-nickel-based metal composite oxide may further include at least one of cobalt (Co) and manganese (Mn). Preferably, the cathode active material may include a Ni—Co—Mn (NCM)-based lithium oxide.

In some embodiments, the cathode active material or the lithium-nickel-based metal oxide may include a layered structure or a crystal structure represented by Chemical Formula 1 below.

$$Li_xNi_aM_bO_{2+y}$$ [Chemical Formula 1]

In Chemical Formula 1, $0.8 \leq x \leq 1.5$, $-0.1 \leq y \leq 0.1$, $0.88 \leq a \leq 0.98$, $0 \leq b \leq 0.2$, and $a+b=1$. In some embodiments, $0 \leq b \leq 0.2$, $0.01 \leq b \leq 0.2$, or $0.02 \leq b \leq 0.2$.

The chemical structure represented by Chemical Formula 1 indicates bonding relationships included in the crystal structure or the layered structure of the cathode active material, and is not intended to not exclude other additional elements. For example, M may include Co and/or Mn, and Co and Mn may serve as a main active element of the cathode active material. Chemical Formula 1 is provided to express the bonding relationships of the main active elements, and is to be understood as a formula allowing an introduction and a substitution of an additional element.

In an embodiment, an auxiliary element may be added to the main active element to enhance chemical stability of the cathode active material or the crystal structure/layered structure. The auxiliary element may be incorporated into the crystal structure/layered structure to form a bond, and Chemical Formula 1 is interpreted to include this structure.

The auxiliary elements may include at least one of, e.g., Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element may act as an auxiliary active element such as Al that contributes to the capacity/power of the cathode active material together with Co or Mn.

For example, the cathode active material or the lithium-nickel-based metal oxide may have a layered structure or a crystal structure represented by Chemical Formula 1-1 below.

$$Li_xNi_aCo_{b1}Mn_{c1}M1_{d1}O_{2+y}$$ [Chemical Formula 1-1]

In Chemical Formula 1-1, M1 may include the above-mentioned auxiliary element. In Chemical Formula 1-1, $0.8 \leq x \leq 1.5$, $-0.1 \leq y \leq 0.1$, $0.88 \leq a \leq 0.98$, $0 \leq b1 \leq 0.1$, $0 \leq c1 \leq 0.1$, $0 \leq d1 \leq 0.1$ and $a+b1+c1+d1=1$. In some embodiments, $0<b1 \leq 0.1$ and $0 \leq c1 \leq 0.1$, $0 \leq b1 \leq 0.1$ and $0<c1 \leq 0.1$, $0.005 \leq b1 \leq 0.1$ and $0.005 \leq c1 \leq 0.1$, or $0.01 \leq b1 \leq 0.1$ and $0.01 \leq c1 \leq 0.1$.

In an embodiment, in Chemical Formula 1-1, $b1 \geq c1$ or $b1>c1$. For example, a content of cobalt in the lithium-nickel metal oxide may be higher than a content of manganese. Accordingly, the crystal lattice of the R-3m crystal structure may be stably controlled. Thus, collapse of the crystal structure may be suppressed even when a high content of nickel is included.

The cathode active material may further include a coating element or a doping element. For example, elements substantially the same as or similar to the above-mentioned auxiliary elements may be used as the coating element or the doping element. For example, one of the above elements or a combination of two or more from the above elements may be used as the coating element or the doping element.

The coating element or the doping element may be present on a surface of the lithium-nickel-based metal oxide particle, or may penetrate through the surface of the lithium-nickel-based metal oxide particle to be included into the bonding structure represented by Chemical Formula 1 or Chemical Formula 1-1.

The above-described cathode active material may be formed through a reaction of a lithium precursor and a transition metal precursor (e.g., Ni—Co—Mn).

For example, the transition metal precursor may be prepared through a co-precipitation of metal salts. The metal salts may include a nickel salt, a manganese salt and a cobalt salt.

The nickel salt may include, e.g., nickel sulfate, nickel nitrate, nickel acetate or a hydrate thereof. The manganese salt may include, e.g., manganese sulfate, manganese acetate or a hydrate thereof. The cobalt salt may include, e.g., cobalt sulfate, cobalt nitrate, cobalt carbonate, or a hydrate thereof.

An aqueous solution may be prepared by mixing the metal salts with a precipitating agent and/or a chelating agent in a ratio satisfying the content or concentration ratio of each metal described with reference to Chemical Formula 1. The aqueous solution may be co-precipitated in a reactor to form the transition metal precursor.

The precipitating agent may include an alkaline compound such as sodium hydroxide (NaOH) or sodium carbonate ($Na_2CO_3$). The chelating agent may include, e.g., ammonia water, ammonium carbonate, etc.

A temperature of the co-precipitation may be controlled, e.g., in a range from about 40° C. to about 60° C. A reaction time may be adjusted in a range from about 24 hours to about 72 hours.

For example, the transition metal precursor may be reacted with a lithium precursor and a doping element source including the doping element to prepare the lithium-nickel metal oxide particles. The lithium precursor may include, e.g., lithium carbonate ($Li_2CO_3$), lithium nitrate ($LiNO_3$), lithium acetate ($CH_3COOLi$), lithium oxide ($Li_2O$), lithium hydroxide (LiOH), etc. These may be used alone or in a combination thereof.

For example, the doping element source may include titanium dioxide, titanium butoxide, manganese sulfate hydrate, aluminum hydroxide, magnesium hydroxide, zirconium hydroxide, zirconium dioxide, yttria-stabilized zirconia, tungsten oxide, etc. These may be used alone or in a combination thereof.

Thereafter, metal particles may be fixed or crystallinity may be increased through a heat treatment (calcination) process. In an embodiment, a temperature of the heat treatment may be in a range from about 600° C. to 1,000° C., from 600° C. to 850° C., or from 650° C. to 800° C.

In some embodiments, a cleaning process may be further performed on the lithium-nickel-based metal oxide particles produced as the cathode active material. The cleaning process may include washing using an aqueous or organic solvent. Lithium impurities (e.g., $Li_2O$, $Li_2CO_3$, etc.)

remaining on the surface of the lithium-nickel composite metal oxide particle may be removed through the cleaning process.

<Lithium Secondary Battery>

According to example embodiments, a lithium secondary battery may include the above-described cathode active material for a lithium secondary battery.

Figure 2:
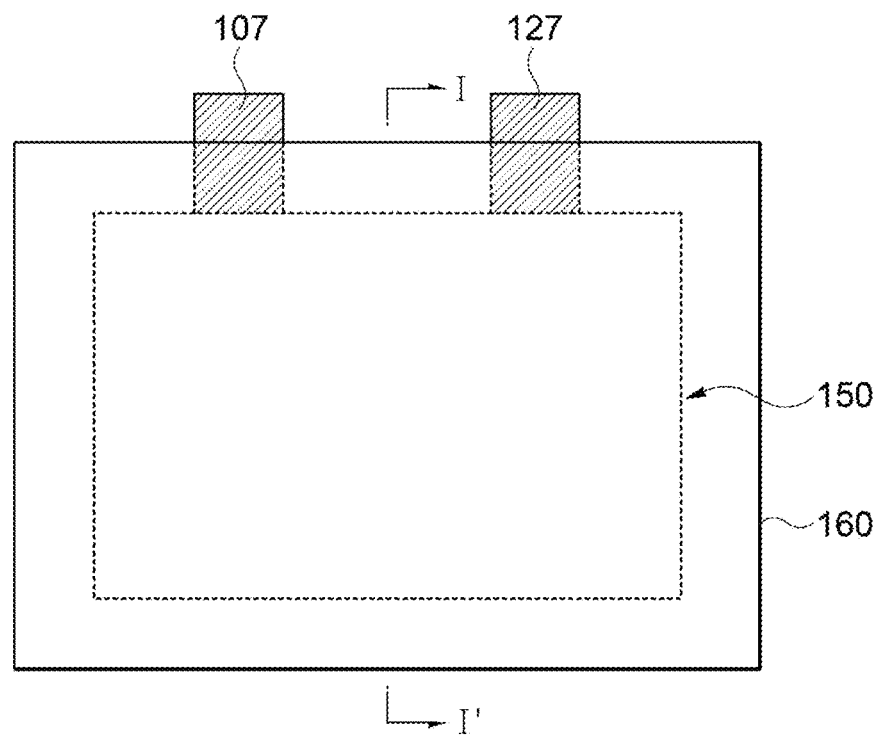
FIGS. 2 and 3 are a schematic plan view and a schematic cross-sectional view, respectively, illustrating a lithium secondary battery in accordance with example embodiments.
Figure 3:
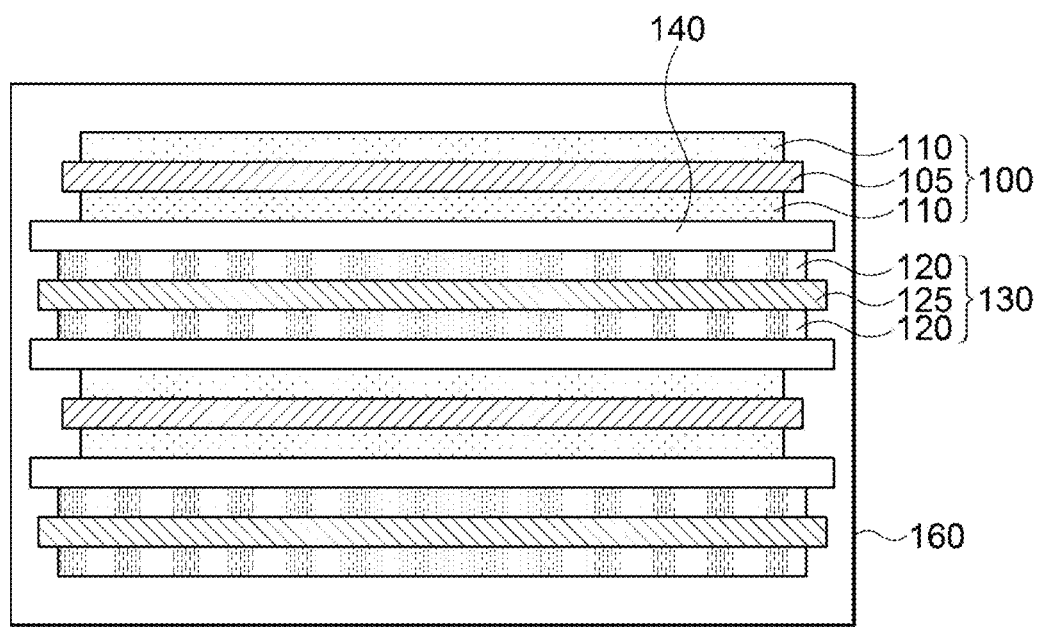

FIGS. 2 and 3 are a schematic plan view and a cross-sectional view, respectively, illustrating a lithium secondary battery according to example embodiments. For example, FIG. 3 is a cross-sectional view taken along a line I-I' of FIG. 2.

Referring to FIGS. 2 and 3, the lithium secondary battery may include a cathode 100 including a cathode active material layer including the above-described cathode active material for a lithium secondary battery and an anode 130 facing the cathode.

The cathode 100 may include the cathode active material layer 110 formed by coating the above-described cathode active material on the cathode current collector 105.

For example, a slurry may be prepared by mixing and stirring the cathode active material with a binder, a conductive material and/or a dispersive agent in a solvent. The slurry may be coated on the cathode current collector 105, and then dried and pressed to form the cathode.

The cathode current collector 105 may include, e.g., stainless steel, nickel, aluminum, titanium, copper, or an alloy thereof. In an embodiment, aluminum or an aluminum alloy may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon-based compound, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc.

The lithium alloy may further include aluminum, zinc, bismuth, cadmium, antimony, silicon, lead, tin, gallium, indium, etc.

The silicon-based compound may include, e.g., silicon, silicon oxide ($SiO_x$, $0<x<2$), or a silicon-carbon composite compound such as silicon carbide (SiC).

The anode current collector 125 may include, e.g., gold, stainless steel, nickel, aluminum, titanium, copper, or an alloy thereof. In an embodiment, copper or a copper alloy may be used.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR), and carboxymethyl cellulose (CMC) may also be used as a thickener.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In example embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, stacking or folding of the separation layer 140.

The electrode assembly 150 may be accommodated together with an electrolyte in an outer case 160 to define the lithium secondary battery. In example embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125 included in each electrode cell to one side of the outer case 160. The electrode tabs may be welded together with the one side of the outer case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

According to example embodiments, the lithium secondary battery may include the lithium-nickel-based metal oxide particles that include a high nickel content and have the crystal size and the thicknesses of the TM slab and the Li slab within the above-described ranges. Accordingly, chemical stability of the cathode active material may be improved and the cation mixing/defect may be suppressed. Thus, the lithium secondary battery having improved capacity, life-span and long-term stability may be implemented.

Hereinafter, embodiments are proposed to more concretely describe the present disclosure invention. However, the following examples are only given for illustrating the present disclosure and those skilled in the related art will obviously understand that various alterations and modifications are possible within the scope and spirit of the present disclosure. Such alterations and modifications are duly included in the appended claims.

EXAMPLES AND COMPARATIVE EXAMPLES (1) Preparation of Cathode Active Material $NiSO_4$, $CoSO_4$ and $MnSO_4$ were mixed so as to have the composition shown in Table 1 below using distilled water from which internal dissolved oxygen was removed by bubbling with $N_2$ for 24 hours. The solution was introduced into a reactor at 50° C., and a co-precipitation reaction was performed for 48 hours using NaOH and $NH_3H_2O$ as a precipitant and a chelating agent, respectively, to obtain a transition metal precursor. The obtained transition metal precursor was dried at 80° C. for 12 hours and then re-dried at 110° C. for 12 hours. The obtained transition metal precursors are shown in Table 1 below.

Lithium hydroxide and the transition metal precursor were mixed in a molar ratio of 1.05:1, put into a firing furnace, heated to in a range from 670° C. to 750° C. at a ramping rate of 2° C./min, and maintained in the range from 670° C. to 750° C. for 10 hours. Oxygen was continuously passed at a flow rate of 20 L/min during the heating and the maintaining. After the firing, natural cooling was performed to room temperature, and them pulverization and classification were performed to obtain a cathode active material was obtained through. The obtained cathode active materials are shown in Table 1 below.

(2) Fabrication of Secondary Battery

A lithium secondary battery was manufactured using the obtained cathode active material.

Specifically, a cathode mixture was prepared by mixing the cathode active material, Denka Black as a conductive material and PVDF as a binder in a mass ratio of 97:2:1, respectively. The prepared cathode mixture was coated on an aluminum current collector, and then dried and pressed to prepare a cathode.

93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then adding 1 wt % of vinylene carbonate, 0.5 wt % 1,3-propensultone (PRS) and 0.5 wt % lithium bis(oxalato)borate (LiBOB).

TABLE 1

| | mixing ratio of $NiSO_4$, $CoSO_4$ and $MnSO_4$ | | | | |
| --- | --- | --- | --- | --- | --- |
| | $NiSO_4$ | $CoSO_4$ | $MnSO_4$ | transition metal precursor | cathode active material |
| Example 1 | 92 | 7 | 1 | $Ni_{0.92}Co_{0.07}Mn_{0.01}(OH)_2$ | $LiNi_{0.92}Co_{0.07}Mn_{0.01}O_2$ |
| Example 2 | 92 | 6 | 2 | $Ni_{0.92}Co_{0.06}Mn_{0.02}(OH)_2$ | $LiNi_{0.92}Co_{0.06}Mn_{0.02}O_2$ |
| Example 3 | 92 | 5 | 3 | $Ni_{0.92}Co_{0.05}Mn_{0.03}(OH)_2$ | $LiNi_{0.92}Co_{0.05}Mn_{0.03}O_2$ |
| Example 4 | 92 | 4 | 4 | $Ni_{0.92}Co_{0.04}Mn_{0.04}(OH)_2$ | $LiNi_{0.92}Co_{0.04}Mn_{0.04}O_2$ |
| Example 5 | 94 | 5 | 1 | $Ni_{0.94}Co_{0.05}Mn_{0.01}(OH)_2$ | $LiNi_{0.94}Co_{0.05}Mn_{0.01}O_2$ |
| Example 6 | 94 | 4 | 2 | $Ni_{0.94}Co_{0.04}Mn_{0.02}(OH)_2$ | $LiNi_{0.94}Co_{0.04}Mn_{0.02}O_2$ |
| Example 7 | 94 | 3 | 3 | $Ni_{0.94}Co_{0.03}Mn_{0.03}(OH)_2$ | $LiNi_{0.94}Co_{0.03}Mn_{0.03}O_2$ |
| Example 8 | 96 | 3 | 1 | $Ni_{0.96}Co_{0.03}Mn_{0.01}(OH)_2$ | $LiNi_{0.96}Co_{0.03}Mn_{0.01}O_2$ |
| Example 9 | 96 | 2 | 2 | $Ni_{0.96}Co_{0.02}Mn_{0.02}(OH)_2$ | $LiNi_{0.96}Co_{0.02}Mn_{0.02}O_2$ |
| Example 10 | 98 | 1 | 1 | $Ni_{0.98}Co_{0.01}Mn_{0.01}(OH)_2$ | $LiNi_{0.98}Co_{0.01}Mn_{0.01}O_2$ |
| Example 11 | 98 | 1 | 1 | $Ni_{0.98}Co_{0.01}Mn_{0.01}(OH)_2$ | $LiNi_{0.98}Co_{0.01}Mn_{0.01}O_2$ |
| Example 12 | 98 | 1 | 1 | $Ni_{0.98}Co_{0.01}Mn_{0.01}(OH)_2$ | $LiNi_{0.98}Co_{0.01}Mn_{0.01}O_2$ |
| Example 13 | 98 | 1 | 1 | $Ni_{0.98}Co_{0.01}Mn_{0.01}(OH)_2$ | $LiNi_{0.98}Co_{0.01}Mn_{0.01}O_2$ |
| Example 14 | 98 | 1 | 1 | $Ni_{0.98}Co_{0.01}Mn_{0.01}(OH)_2$ | $LiNi_{0.98}Co_{0.01}Mn_{0.01}O_2$ |
| Example 15 | 98 | 1 | 1 | $Ni_{0.98}Co_{0.01}Mn_{0.01}(OH)_2$ | $LiNi_{0.98}Co_{0.01}Mn_{0.01}O_2$ |
| Example 16 | 98 | 1 | 1 | $Ni_{0.98}Co_{0.01}Mn_{0.01}(OH)_2$ | $LiNi_{0.98}Co_{0.01}Mn_{0.01}O_2$ |
| Example 17 | 98 | 1 | 1 | $Ni_{0.98}Co_{0.01}Mn_{0.01}(OH)_2$ | $LiNi_{0.98}Co_{0.01}Mn_{0.01}O_2$ |
| Example 18 | 92 | 8 | 0 | $Ni_{0.92}Co_{0.08}(OH)_2$ | $LiNi_{0.92}Co0.08O_2$ |
| Example 19 | 94 | 6 | 0 | $Ni_{0.94}Co_{0.06}(OH)_2$ | $LiNi_{0.94}Co0.06O_2$ |
| Example 20 | 96 | 4 | 0 | $Ni_{0.96}Co_{0.04}(OH)_2$ | $LiNi_{0.96}Co0.04O_2$ |
| Example 21 | 98 | 2 | 0 | $Ni_{0.98}Co_{0.02}(OH)_2$ | $LiNi_{0.98}Co0.02O_2$ |
| Comparative Example 1 | 92 | 3 | 5 | $Ni_{0.92}Co_{0.03}Mn_{0.05}(OH)_2$ | $LiNi_{0.92}Co_{0.03}Mn_{0.05}O_2$ |

TABLE 1-continued

| | mixing ratio of NiSO$_4$, CoSO$_4$ and MnSO$_4$ | | | transition metal precursor | cathode active material |
|---|---|---|---|---|---|
| | NiSO$_4$ | CoSO$_4$ | MnSO$_4$ | | |
| Comparative Example 2 | 92 | 2 | 6 | Ni$_{0.92}$Co$_{0.02}$Mn$_{0.06}$(OH)$_2$ | LiNi$_{0.92}$Co$_{0.02}$Mn$_{0.06}$O$_2$ |
| Comparative Example 3 | 92 | 1 | 7 | Ni$_{0.92}$Co$_{0.01}$Mn$_{0.07}$(OH)$_2$ | LiNi$_{0.92}$Co$_{0.01}$Mn$_{0.07}$O$_2$ |
| Comparative Example 4 | 94 | 2 | 4 | Ni$_{0.94}$Co$_{0.02}$Mn$_{0.04}$(OH)$_2$ | LiNi$_{0.94}$Co$_{0.02}$Mn$_{0.04}$O$_2$ |
| Comparative Example 5 | 94 | 1 | 5 | Ni$_{0.94}$Co$_{0.01}$Mn$_{0.05}$(OH)$_2$ | LiNi$_{0.94}$Co$_{0.01}$Mn$_{0.05}$O$_2$ |
| Comparative Example 6 | 96 | 1 | 3 | Ni$_{0.96}$Co$_{0.01}$Mn$_{0.03}$(OH)$_2$ | LiNi$_{0.96}$Co$_{0.01}$Mn$_{0.03}$O$_2$ |
| Comparative Example 7 | 92 | 0 | 8 | Ni$_{0.92}$Mn$_{0.08}$(OH)$_2$ | LiNi$_{0.92}$Mn$_{0.08}$O$_2$ |
| Comparative Example 8 | 94 | 0 | 6 | Ni$_{0.94}$Mn$_{0.06}$(OH)$_2$ | LiNi$_{0.94}$Mn$_{0.06}$O$_2$ |
| Comparative Example 9 | 96 | 0 | 4 | Ni$_{0.96}$Mn$_{0.04}$(OH)$_2$ | LiNi$_{0.96}$Mn$_{0.04}$O$_2$ |
| Comparative Example 10 | 98 | 0 | 2 | Ni$_{0.98}$Mn$_{0.02}$(OH)$_2$ | LiNi$_{0.98}$Mn$_{0.02}$O$_2$ |

(3) XRD Analysis

1) Measurement of Crystal Size in (104) Plane

For each of the cathode active materials of Examples and Comparative Examples, a crystal size in a (104) plane and a crystal size in the (003) plane were calculated using an XRD diffraction analysis and Equations 1 and 2 below.

$$L_{104} = \frac{K\lambda}{\beta_{104}\cos\theta} \quad \text{[Equation 1]}$$

In Equation 1, $L_{104}$ is a crystal size (nm) in the (104) plane, K is a shape factor, $\lambda$ is an X-ray wavelength (nm), $\beta_{104}$ is a full width at half maximum (rad) of a (104) plane peak through an XRD analysis, and $\theta$ represents a diffraction angle (rad).

$$L_{003} = \frac{K\lambda}{\beta_{003}\cos\theta} \quad \text{[Equation 2]}$$

In Equation 2, $L_{003}$ is a crystal size (nm) in the (003) plane, K is a shape factor, $\lambda$ is an X-ray wavelength (nm), $\beta_{003}$ is a full width at half maximum (rad) of a (003) plane peak through an XRD analysis, and $\theta$ represents a diffraction angle (rad).

2) Measurement of Thickness of Li Slab

For each of the cathode active materials of Examples and Comparative Examples, a thickness of a Li slab was measured by a crystal structure analysis by a Rietveld refinement when a space group R-3m through an XRD diffraction analysis was used in a crystal structure model. Specifically, analysis of the Rietveld method was performed using a TOPAS program.

3) Measure of Thickness of TM Slab

For each of the cathode active materials of Examples and Comparative Examples, a thickness of a TM slab was measured by a crystal structure analysis by a Rietveld refinement when a space group R-3m through an XRD diffraction analysis was used in a crystal structure model. Specifically, analysis of the Rietveld method was performed using a TOPAS program.

4) Measurement of Lattice Constant, Cell Volume and Oxygen Parameter

For each of the cathode active materials of Examples and Comparative Examples, a lattice constant, a cell volume in a lattice unit, and an oxygen parameter were measured through XRD diffraction analysis.

Specific XRD analysis equipment/conditions are as shown in Table 2 below.

TABLE 2

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10–120° |
| Scan Step Size | 0.0065° |
| Divergence slit | 1/4° |
| Antiscatter slit | 1° |

The measured results are shown in Tables 3 and 4.

TABLE 3

| | crystal size(nm) | | Li slab thickness (Å) | TM slab thickness (Å) |
|---|---|---|---|---|
| | (104) plane peak | (003) plane peak | | |
| Example 1 | 99 | 258 | 2.593 | 2.141 |
| Example 2 | 93 | 229 | 2.594 | 2.143 |
| Example 3 | 96 | 254 | 2.592 | 2.142 |
| Example 4 | 94 | 239 | 2.599 | 2.150 |
| Example 5 | 96 | 253 | 2.597 | 2.137 |
| Example 6 | 92 | 229 | 2.585 | 2.135 |
| Example 7 | 95 | 245 | 2.590 | 2.141 |
| Example 8 | 95 | 243 | 2.591 | 2.141 |
| Example 9 | 96 | 253 | 2.591 | 2.142 |
| Example 10 | 97 | 255 | 2.590 | 2.143 |
| Example 11 | 42 | 133 | 2.587 | 2.141 |
| Example 12 | 70 | 181 | 2.592 | 2.140 |
| Example 13 | 81 | 220 | 2.589 | 2.143 |
| Example 14 | 97 | 224 | 2.590 | 2.141 |
| Example 15 | 114 | 275 | 2.591 | 2.141 |
| Example 16 | 118 | 277 | 2.593 | 2.139 |
| Example 17 | 141 | 296 | 2.592 | 2.139 |

TABLE 3-continued

| | crystal size(nm) | | Li slab thickness (Å) | TM slab thickness (Å) |
|---|---|---|---|---|
| | (104) plane peak | (003) plane peak | | |
| Example 18 | 96 | 250 | 2.596 | 2.143 |
| Example 19 | 93 | 232 | 2.595 | 2.143 |
| Example 20 | 93 | 232 | 2.599 | 2.148 |
| Example 21 | 90 | 227 | 2.586 | 2.136 |
| Comparative Example 1 | 100 | 260 | 2.637 | 2.188 |
| Comparative Example 2 | 91 | 228 | 2.617 | 2.169 |
| Comparative Example 3 | 93 | 235 | 2.623 | 2.176 |
| Comparative Example 4 | 93 | 235 | 2.693 | 2.245 |
| Comparative Example 5 | 98 | 256 | 2.683 | 2.236 |
| Comparative Example 6 | 98 | 256 | 2.632 | 2.185 |
| Comparative Example 7 | 95 | 240 | 2.675 | 2.229 |
| Comparative Example 8 | 100 | 260 | 2.681 | 2.235 |
| Comparative Example 9 | 90 | 221 | 2.625 | 2.179 |
| Comparative Example 10 | 96 | 248 | 2.689 | 2.243 |

TABLE 4

| | lattice parameter | | | | |
|---|---|---|---|---|---|
| | a axis = b axis (Å) | c axis (Å) | c/a | cell volume (Å³) | Oxygen Parameter |
| Example 1 | 2.877 | 14.200 | 4.956 | 101.789 | 0.2579 |
| Example 2 | 2.877 | 14.190 | 4.932 | 101.731 | 0.2578 |
| Example 3 | 2.877 | 14.198 | 4.935 | 101.747 | 0.2580 |
| Example 4 | 2.877 | 14.195 | 4.934 | 101.744 | 0.2579 |
| Example 5 | 2.879 | 14.192 | 4.929 | 101.795 | 0.2579 |
| Example 6 | 2.875 | 14.201 | 4.939 | 101.707 | 0.2580 |
| Example 7 | 2.878 | 14.191 | 4.931 | 101.790 | 0.2579 |
| Example 8 | 2.879 | 14.194 | 4.930 | 101.813 | 0.2578 |
| Example 9 | 2.875 | 14.196 | 4.938 | 101.664 | 0.2578 |
| Example 10 | 2.878 | 14.199 | 4.934 | 101.791 | 0.2580 |
| Example 11 | 2.880 | 14.189 | 4.927 | 101.822 | 0.2581 |
| Example 12 | 2.878 | 14.195 | 4.932 | 101.795 | 0.2580 |
| Example 13 | 2.877 | 14.196 | 4.934 | 101.764 | 0.2579 |
| Example 14 | 2.878 | 14.194 | 4.932 | 101.798 | 0.2579 |
| Example 15 | 2.877 | 14.197 | 4.935 | 101.787 | 0.2579 |
| Example 16 | 2.878 | 14.196 | 4.933 | 101.798 | 0.2580 |
| Example 17 | 2.877 | 14.193 | 4.933 | 101.729 | 0.2580 |
| Example 18 | 2.876 | 14.197 | 4.936 | 101.727 | 0.2578 |
| Example 19 | 2.877 | 14.193 | 4.933 | 101.737 | 0.2578 |
| Example 20 | 2.880 | 14.195 | 4.929 | 101.848 | 0.2581 |
| Example 21 | 2.879 | 14.190 | 4.929 | 101.792 | 0.2581 |
| Comparative Example 1 | 2.877 | 14.200 | 4.936 | 101.799 | 0.2579 |
| Comparative Example 2 | 2.879 | 14.192 | 4.929 | 101.809 | 0.2578 |
| Comparative Example 3 | 2.876 | 14.199 | 4.937 | 101.729 | 0.2579 |
| Comparative Example 4 | 2.875 | 14.198 | 4.938 | 101.700 | 0.2578 |
| Comparative Example 5 | 2.877 | 14.194 | 4.934 | 101.738 | 0.2578 |
| Comparative Example 6 | 2.879 | 14.196 | 4.931 | 101.821 | 0.2580 |
| Comparative Example 7 | 2.879 | 14.193 | 4.930 | 101.811 | 0.2580 |
| Comparative Example 8 | 2.879 | 14.201 | 4.933 | 101.842 | 0.2578 |
| Comparative Example 9 | 2.878 | 14.189 | 4.930 | 101.777 | 0.2580 |
| Comparative Example 10 | 2.880 | 14.197 | 4.930 | 101.853 | 0.2580 |

Experimental Example (1) Measurement of Cation Mixing Ratio

A cation mixing may refer to, e.g., a phenomenon that nickel ions are located in a lithium layer in a layered structure of the lithium-nickel metal oxide particle. When a cation mixing ratio is high, a discharge capacity may be decreased.

The cation mixing ratio in the cathode active material according to each of the above-described Examples and Comparative Examples was measured using a Rietveld method.

Specifically, XRD peaks were measured, and accuracy of lattice constants was enhanced through a least square method or a Rawlay method. Thereafter, an XRD simulation was performed on a structure model constructed by estimating the arrangement of each atom based on a crystallographic knowledge and a chemical composition. Through the simulation, a ratio of nickel ions occupying a lithium site (3a site) of the cathode active material was calculated.

(2) Measurement of Initial Charge/Discharge Capacity and Evaluation on Initial Capacity Efficiency Evaluation The lithium secondary battery manufactured according to each of the above-described Examples and Comparative Examples were charged (CC-CV 0.1C 4.3V 0.005C CUT-OFF) in a chamber at 25° C., and then a battery capacity (initial charge capacity) was measured. Thereafter, the battery was discharged (CC 0.1C 3.0V CUT-OFF), and then a battery capacity (initial discharge capacity) was measured.

An initial capacity efficiency was evaluated as a percentage (%) of the initial discharge capacity relative to the initial charge capacity.

(3) Measurement of Capacity Retention (Life-Span Property) During Repeated Charging and Discharging The lithium secondary battery according to each of the above-described Examples and Comparative Examples was charged (CC/CV 0.5C 4.3V 0.05C CUT-OFF) and discharged (CC 1.0C 3.0V CUT-OFF) repeatedly 50 times. A discharge capacity retention was evaluated as a percentage of a discharge capacity at 50th cycle to a discharge capacity at 1st cycle.

The evaluation results are shown in Table 5 below.

TABLE 5

| | cation mixing ratio (%) | initial charge capacity (mAh/g) | initial discharge capacity (mAh/g) | initial capacity efficiency (%) | capacity retention (%) |
|---|---|---|---|---|---|
| Example 1 | 1.13 | 240.1 | 223.0 | 92.9 | 93.9 |
| Example 2 | 1.26 | 240.3 | 222.5 | 92.6 | 95.9 |
| Example 3 | 1.35 | 240.4 | 222.2 | 92.4 | 96.5 |
| Example 4 | 1.48 | 239.9 | 219.8 | 91.6 | 96.4 |
| Example 5 | 1.20 | 243.5 | 224.9 | 92.4 | 93.3 |
| Example 6 | 1.38 | 243.2 | 224.2 | 92.2 | 94.6 |
| Example 7 | 1.46 | 243.0 | 224.1 | 92.2 | 95.1 |
| Example 8 | 1.32 | 246.2 | 223.8 | 90.9 | 92.3 |
| Example 9 | 1.49 | 246.1 | 228.5 | 92.8 | 94.2 |

TABLE 5-continued

| | cation mixing ratio (%) | initial charge capacity (mAh/g) | initial discharge capacity (mAh/g) | initial capacity efficiency (%) | capacity retention (%) |
|---|---|---|---|---|---|
| Example 10 | 1.50 | 250.5 | 227.9 | 91.0 | 92.0 |
| Example 11 | 1.54 | 250.2 | 229.9 | 91.9 | 89.7 |
| Example 12 | 1.14 | 250.9 | 231.4 | 92.2 | 92.8 |
| Example 13 | 1.54 | 250.7 | 231.6 | 92.4 | 93.2 |
| Example 14 | 1.46 | 250.4 | 232.9 | 93.0 | 95.7 |
| Example 15 | 1.49 | 249.9 | 233.1 | 93.3 | 94.6 |
| Example 16 | 1.15 | 250.1 | 231.7 | 92.6 | 94.1 |
| Example 17 | 1.28 | 250.2 | 230.2 | 92.0 | 91.8 |
| Example 18 | 1.06 | 240.1 | 223.2 | 93.0 | 93.3 |
| Example 19 | 1.15 | 242.9 | 225.3 | 92.8 | 92.5 |
| Example 20 | 1.27 | 245.8 | 229.6 | 93.4 | 90.8 |
| Example 21 | 1.31 | 250.2 | 233.8 | 93.4 | 90.5 |
| Comparative Example 1 | 1.60 | 240.8 | 218.3 | 90.7 | 89.7 |
| Comparative Example 2 | 1.77 | 240.7 | 217.6 | 90.4 | 89.0 |
| Comparative Example 3 | 1.89 | 240.1 | 216.4 | 90.1 | 87.9 |
| Comparative Example 4 | 1.68 | 243.2 | 223.7 | 92.0 | 85.5 |
| Comparative Example 5 | 1.93 | 243.4 | 222.5 | 91.4 | 85.2 |
| Comparative Example 6 | 1.79 | 246.3 | 226.8 | 92.1 | 82.7 |
| Comparative Example 7 | 2.00 | 239.7 | 217.1 | 90.6 | 87.2 |
| Comparative Example 8 | 2.07 | 242.8 | 220.2 | 90.7 | 84.2 |
| Comparative Example 9 | 2.10 | 246.2 | 224.9 | 91.3 | 82.0 |
| Comparative Example 10 | 2.10 | 250.1 | 228.5 | 91.4 | 81.4 |

Referring to Table 5, in Examples where the content of Co of the cathode active material was greater than the content of Mn, the thickness of the Li slab was 2.585 Å or more, and the thickness of the TM slab was 2.15 Å or less, the cation mixing ratio was 1.60% or less, and the initial capacity efficiency was 90% or more, and the capacity retention was 89% or more.

In Example 11 where the crystal size in the (104) plane was 50 nm or less, the cation mixing ratio was increased and the initial capacity efficiency and capacity retention rate were reduced relatively to those from Examples 12 to 17 where the crystal size in the (104) plane was in a range from 50 nm to 200 nm.

In Examples 18 to 21 using the Ni—Co compound as the transition metal of the cathode active material, the cation mixing ratio and capacity retention were reduced relatively to those from Examples 1 to 17 using the Ni—Co—Mn compound as the transition metal.

What is claimed is:

1. A cathode active material for a lithium secondary battery having a structure of a lithium-nickel-based metal oxide,
   wherein a crystal size in a (104) plane defined by Equation 1 is less than 200 nm,
   a thickness of a TM slab measured by a Rietveld method in a crystal structure of a space group R-3m by an X-ray diffraction (XRD) analysis is in a range of 2.13 Å to 2.15 Å, and
   a thickness of a Li slab measured by the Rietveld method in the crystal structure of the space group R-3m by the XRD analysis is 2.585 Å or more:

$$L_{104} = \frac{K\lambda}{\beta_{104}\cos\theta} \quad \text{[Equation 1]}$$

wherein, in Equation 1, $L_{104}$ is a crystal size (nm) in the (104) plane, K is a shape factor, $\lambda$ is an X-ray wavelength (nm), $\beta_{104}$ is a full width at half maximum (rad) of a (104) plane peak from the XRD analysis, and $\theta$ represents a diffraction angle (rad).

2. The cathode active material for a lithium secondary battery according to claim 1, wherein the lithium-nickel-based metal oxide has a layered structure or a crystal structure represented by Chemical Formula 1-1:

$$Li_xNi_aCo_{b1}Mn_{c1}M1_{d1}O_{2+y} \quad \text{[Chemical Formula 1-1]}$$

wherein, in Chemical Formula 1-1, M1 includes at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr, 0.8≤x≤1.5, −0.1≤y≤0.1, 0.88≤a≤0.98, 0≤b1≤0.1, 0≤c1≤0.1, 0≤d1≤0.1 and a+b1+c1+d1=1.

3. The cathode active material for a lithium secondary battery according to claim 2, wherein b1≥c1 in Chemical Formula 1-1.

4. The cathode active material for a lithium secondary battery according to claim 1, wherein the thickness of the Li slab is in a range from 2.59 Å to 2.615 Å.

5. The cathode active material for a lithium secondary battery according to claim 1, wherein a ratio of the thickness of the Li slab to the thickness of the TM slab is in a range from 1.20 to 1.25.

6. The cathode active material for a lithium secondary battery according to claim 1, wherein the crystal size in the (104) plane defined by Equation 1 is 120 nm or less.

7. The cathode active material for a lithium secondary battery according to claim 1, wherein the crystal size in the (104) plane defined by Equation 1 is 50 nm or more.

8. The cathode active material for a lithium secondary battery according to claim 1, wherein the crystal size in a (003) plane defined by Equation 2 below is in a range from 150 nm to 300 nm:

$$L_{003} = \frac{K\lambda}{\beta_{003}\cos\theta} \quad \text{[Equation 2]}$$

wherein, in Equation 2, $L_{003}$ is the crystal size (nm) in the (003) plane, K is a shape factor, $\lambda$ is an X-ray wavelength (nm), $\beta_{003}$ is a full width at half maximum (rad) of a (003) plane peak from the XRD analysis, and $\theta$ represents a diffraction angle (rad).

9. The cathode active material for a lithium secondary battery according to claim 8, wherein a ratio of the crystal size defined by Equation 2 to the crystal size defined by Equation 1 is in a range from 1.5 to 3.

10. The cathode active material for a lithium secondary battery according to claim 1, wherein an a-axis lattice constant and a b-axis lattice constant measured by the Rietveld method in the crystal structure of the space group R-3m by the XRD analysis are the same, and
    a ratio of a c-axis lattice constant to the a-axis lattice constant is in a range from 4.8 to 5.2.

11. The cathode active material for a lithium secondary battery according to claim 10, wherein a volume of a unit cell of the crystal structure is in a range from 101.6 Å³ to 101.9 Å³.

12. The cathode active material for a lithium secondary battery according to claim 1, wherein a ratio of a peak intensity of a (003) plane to a peak intensity of the (104) plane by the XRD analysis is in a range from 1.8 to 2.2.

13. A lithium secondary battery, comprising:
- a cathode comprising the cathode active material layer for a lithium secondary battery of claim 1; and
- an anode facing the cathode.

* * * * *